(12) United States Patent
Kalyanasundaram et al.

(10) Patent No.: US 12,050,850 B2
(45) Date of Patent: Jul. 30, 2024

(54) FILLER CELLS FOR INTEGRATED CIRCUIT DESIGN

(71) Applicant: International Business Machines Corporation, Armonk, NY (US)

(72) Inventors: Shankar Kalyanasundaram, Bengaluru (IN); Ananth Nag Raja Darla, Bangalore (IN); Amit Bipinbhai Patel, Bengaluru (IN); Krishnan Mohan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 480 days.

(21) Appl. No.: 17/349,896

(22) Filed: Jun. 16, 2021

(65) Prior Publication Data

US 2022/0405454 A1    Dec. 22, 2022

(51) Int. Cl.
*G06F 30/367* (2020.01)
*G06F 30/394* (2020.01)
*H01L 21/027* (2006.01)
*H01L 27/02* (2006.01)

(52) U.S. Cl.
CPC .......... *G06F 30/367* (2020.01); *G06F 30/394* (2020.01); *H01L 21/027* (2013.01); *H01L 27/0207* (2013.01)

(58) Field of Classification Search
CPC .. G06F 30/367; G06F 30/394; G06F 2119/18; H01L 21/027; H01L 27/0207; H01L 2027/11835
See application file for complete search history.

(56) References Cited

U.S. PATENT DOCUMENTS

| 5,910,452 | A | 6/1999 | Kang |
| 6,502,229 | B2 | 12/2002 | Lee |
| 7,073,148 | B1 | 7/2006 | Jenkins |
| 7,302,663 | B1* | 11/2007 | Gan ........................ G06F 30/30 716/112 |
| 7,444,609 | B2* | 10/2008 | Charlebois ............ G06F 30/392 716/132 |
| 2002/0066067 | A1 | 5/2002 | Wang |

(Continued)

FOREIGN PATENT DOCUMENTS

| CN | 103928457 B | 6/2017 |
| CN | 107452718 B | 10/2019 |

OTHER PUBLICATIONS

"LEF/DEF 5.8 Language Reference;" Cadence Design Systems, Inc. (May 2017). (Year: 2017).*

(Continued)

*Primary Examiner* — Benjamin P Sandvik
*Assistant Examiner* — John Patrick Cornely
(74) *Attorney, Agent, or Firm* — Jeffrey Ingalls

(57) ABSTRACT

A method of designing an integrated circuit (IC) chip is discloses. The method includes designing a higher level comprising a plurality of outputs configured to be connected to inputs in a previously-designed macro level, wherein each input in the macro level includes a configurable filler cell. The method also includes calculating if each input includes an antenna violation based on the higher level and the macro level, and configuring each of the filler cells, wherein each filler cell associated with an antenna violation is configured as an antenna diode.

6 Claims, 18 Drawing Sheets

(56) References Cited

U.S. PATENT DOCUMENTS

2002/0138817 A1* 9/2002 Lee .................. G06F 30/39
716/112
2009/0026502 A1 1/2009 Wu

OTHER PUBLICATIONS

"Antenna violations resolved using new method," EDN.com, Aug. 14, 2015, 8 pages. <https://www.edn.com/antenna-violations-resolved-using-new-method/>.
"Mitigating antenna effect in IC design," EETIndia.com, Nov. 15, 2013, 3 pages. <https://archive.eetindia.co.in/www.eetindia.co.in/ART_8800691814_1800000_TA_714f5a48_2.HTM>.
Anonymous, "Method for Performing Timing Driven Antenna Violation Correction in Digital IC Design," IP.com, Disclosure No. IPCOM000202344D, Dec. 14, 2010, 6 pages. <https://priorart.ip.com/IPCOM/000202344>.
Mell et al., "The NIST Definition of Cloud Computing," Recommendations of the National Institute of Standards and Technology, U.S. Department of Commerce, Special Publication 800-145, Sep. 2011, 7 pages.

\* cited by examiner

FILLER CELLS FOR INTEGRATED CIRCUIT DESIGN

BACKGROUND

The present disclosure relates to integrated circuits, and more specifically, to designing integrated circuit chip using filler cells that can be changed during the design process.

An integrated circuit (IC) can be designed such that relatively long metal components (e.g., vias, interconnects) are connected with relatively small transistor gates to achieve a given functionality and/or performance goal. Unfortunately, during manufacturing of such an IC, the long metal components can collect electrical charge due to, for example, a plasma etching process. A subsequent electrostatic discharge of this electricity can break down the transistor gate. To avoid such a situation, the IC can be redesigned to shorten the metal components by changing which layer they connect to. However, the redesigning process can take time and effort. In the alternative, the IC can be designed with a diode that prevents the charge from destroying the gate. However, diodes can add capacitance to the IC, which uses more power and increases resistive-capacitive delay.

SUMMARY

According to an embodiment of the present disclosure, a method of designing an integrated circuit (IC) chip is discloses. The method includes designing a higher level comprising a plurality of outputs configured to be connected to inputs in a previously-designed macro level, wherein each input in the macro level includes a configurable filler cell. The method also includes calculating if each input includes an antenna violation based on the higher level and the macro level, and configuring each of the filler cells, wherein each filler cell associated with an antenna violation is configured as an antenna diode.

According to an embodiment of the present disclosure, a method of designing an IC chip includes designing, by a first team, a plurality of front end of line (FEOL) layers comprising a plurality of inputs, wherein each of the plurality of inputs includes a configurable filler cell. The method also includes designing, by a second team, a plurality of back end of line (BEOL) layers comprising a plurality of outputs configured to be connected to the plurality of inputs, and configuring at least some of the filler cells by the second team.

According to an embodiment of the present disclosure, a method of manufacturing an IC chip includes designing a macro level in a design exchange format (DEF) file, the macro level comprising a plurality of inputs configured to be connected to a plurality of outputs from a higher level, wherein each input in the macro level includes a configurable filler cell. The method also includes designing the higher level in the DEF file, calculating if each input includes an antenna violation, configuring each of the filler cells in the DEF file, wherein each filler cell associated with an antenna violation is configured as an antenna diode, and creating a fabrication mask based on the DEF file.

DETAILED DESCRIPTION

Figure 1:
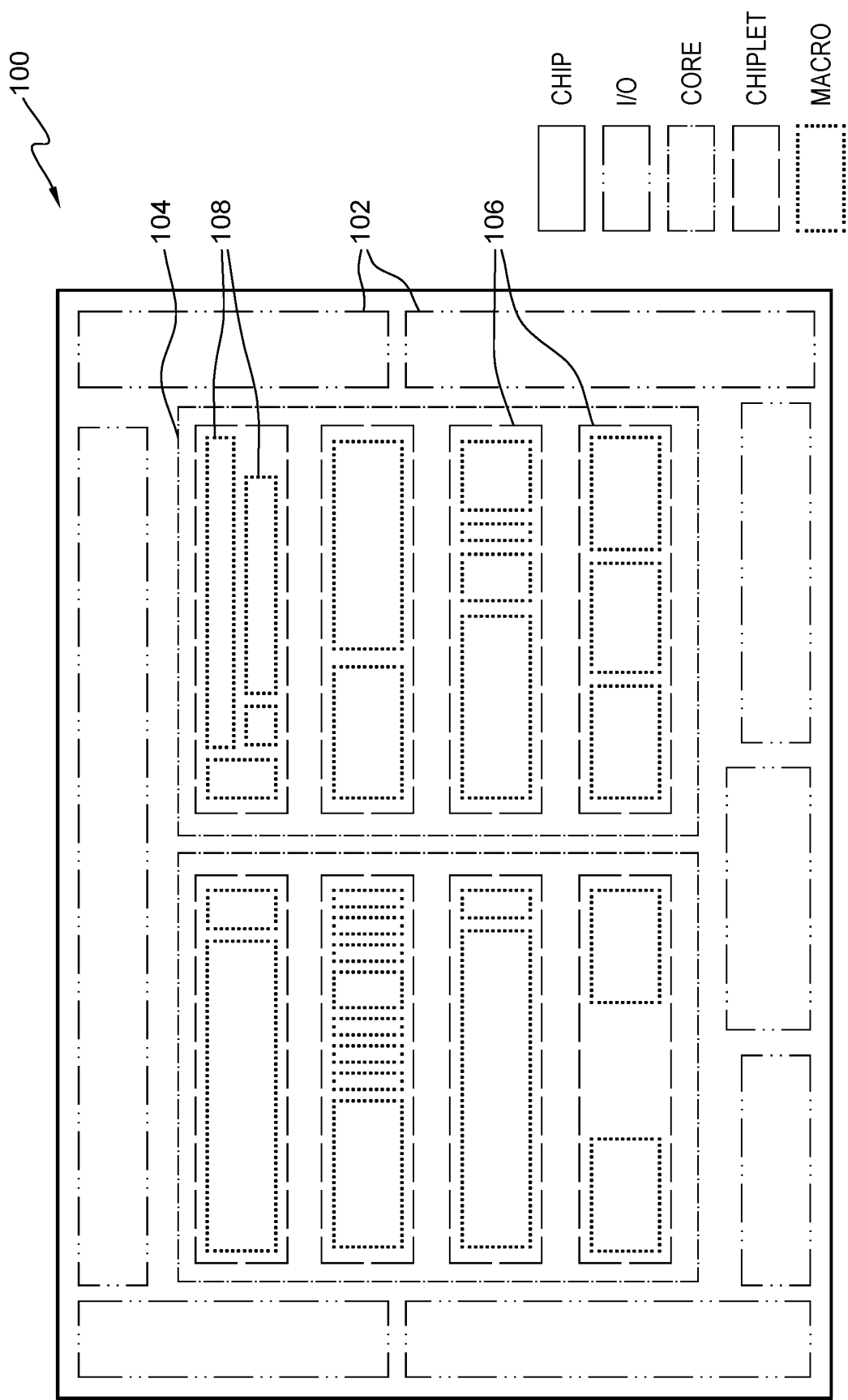
FIG. 1 is a top hierarchical view of an IC chip, in accordance with an embodiment of the present disclosure.

Various embodiments of the present disclosure are described herein with reference to the related drawings. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layers "C" and "D") are between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus. In addition, any numerical ranges included herein are inclusive of their boundaries unless explicitly stated otherwise.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted, the term "selective to," such as, for example, "a first element selective to a second element," means that a first element can be etched, and the second element can act as an etch stop.

For the sake of brevity, conventional techniques related to semiconductor device and integrated circuit (IC) fabrication may or may not be described in detail herein. Moreover, the various tasks and process operations described herein can be incorporated into a more comprehensive procedure or process having additional operations or functionality not described in detail herein. In particular, various operations in the manufacture of semiconductor devices and semiconductor-based ICs are well known and so, in the interest of brevity, many conventional operations will only be mentioned briefly herein or will be omitted entirely without providing the well-known process details.

FIG. 1 is a top hierarchical view of IC chip 100. In the illustrated embodiment, IC chip 100 is comprised of input/output (I/O) features 102 and cores 104, and cores 104 are comprised of chiplets 106 and macros 108. Macros 108 exist at the most basic hierarchical level of IC chip 100 and are configured to be communicatively connected to other components, such as chiplets 106, cores 104, and I/O features 102. Chiplets 106 exist at the next higher hierarchical level from macros 108 and are positioned adjacent to macros 108. Chiplets 106 can be selectively communicatively and/or physically connected to macros 108. In some embodiments, different teams of personnel are responsible for designing different levels of IC chip 100 (including a team in charge of the overall design of IC chip 100), and there can be different teams designing different features that exist at the same hierarchical level (e.g., a different team for each chiplet 106). In addition, these teams may have limited communication with one another.

Figure 2A:
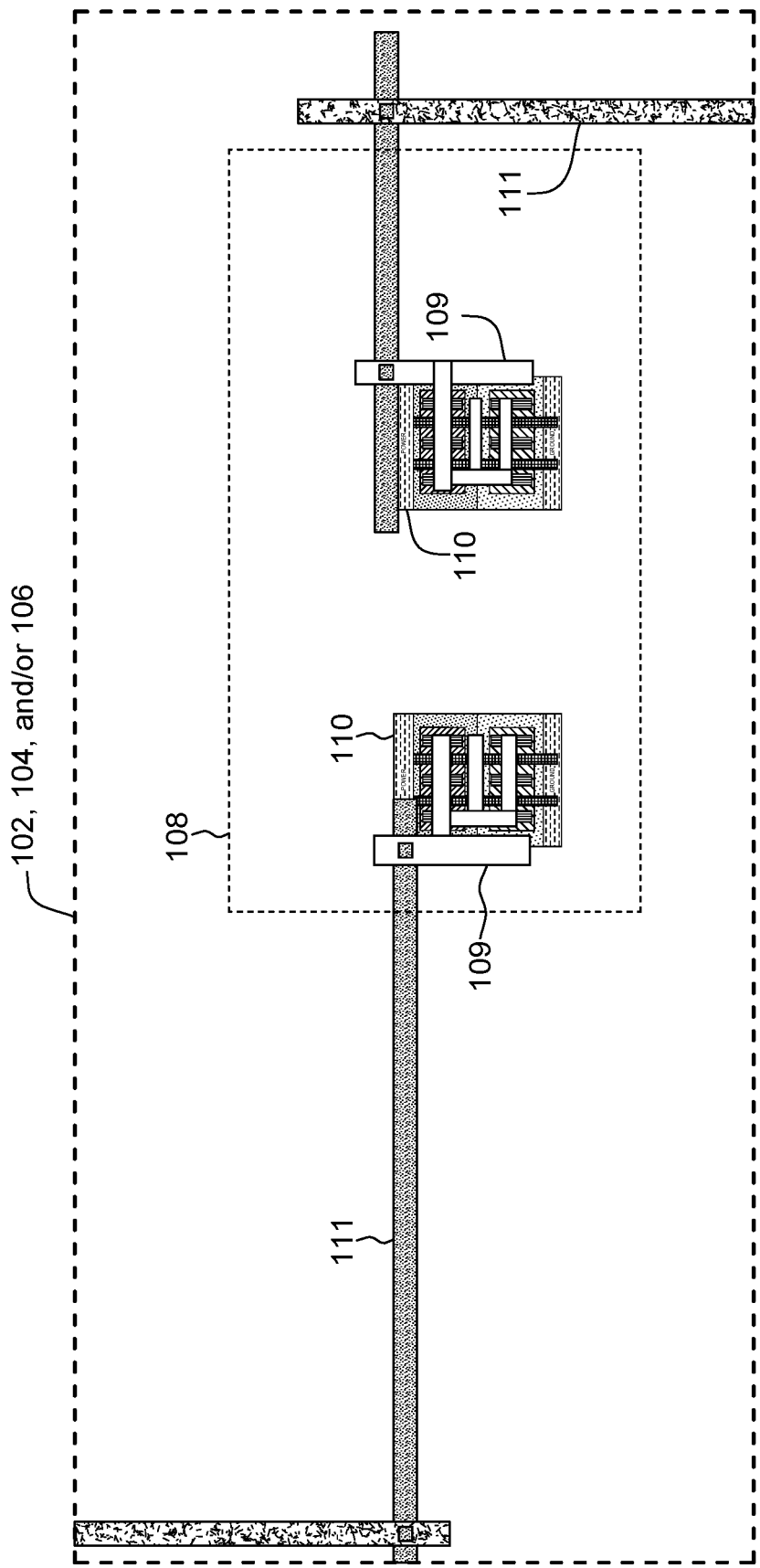
FIG. 2A is a schematic top view of a macro including two primary inputs, in accordance with an embodiment of the present disclosure.

FIG. 2A is a schematic top view of macro 108 including two primary inputs (PIs) 109. In the illustrated embodiment, each PI 109 is connected to a filler cell 110. In addition, each PI 109 is connected to a higher-level component, such as, for example, an I/O feature 102, a core 104, and/or a chiplet 106 via interconnects 111.

Figure 2B:
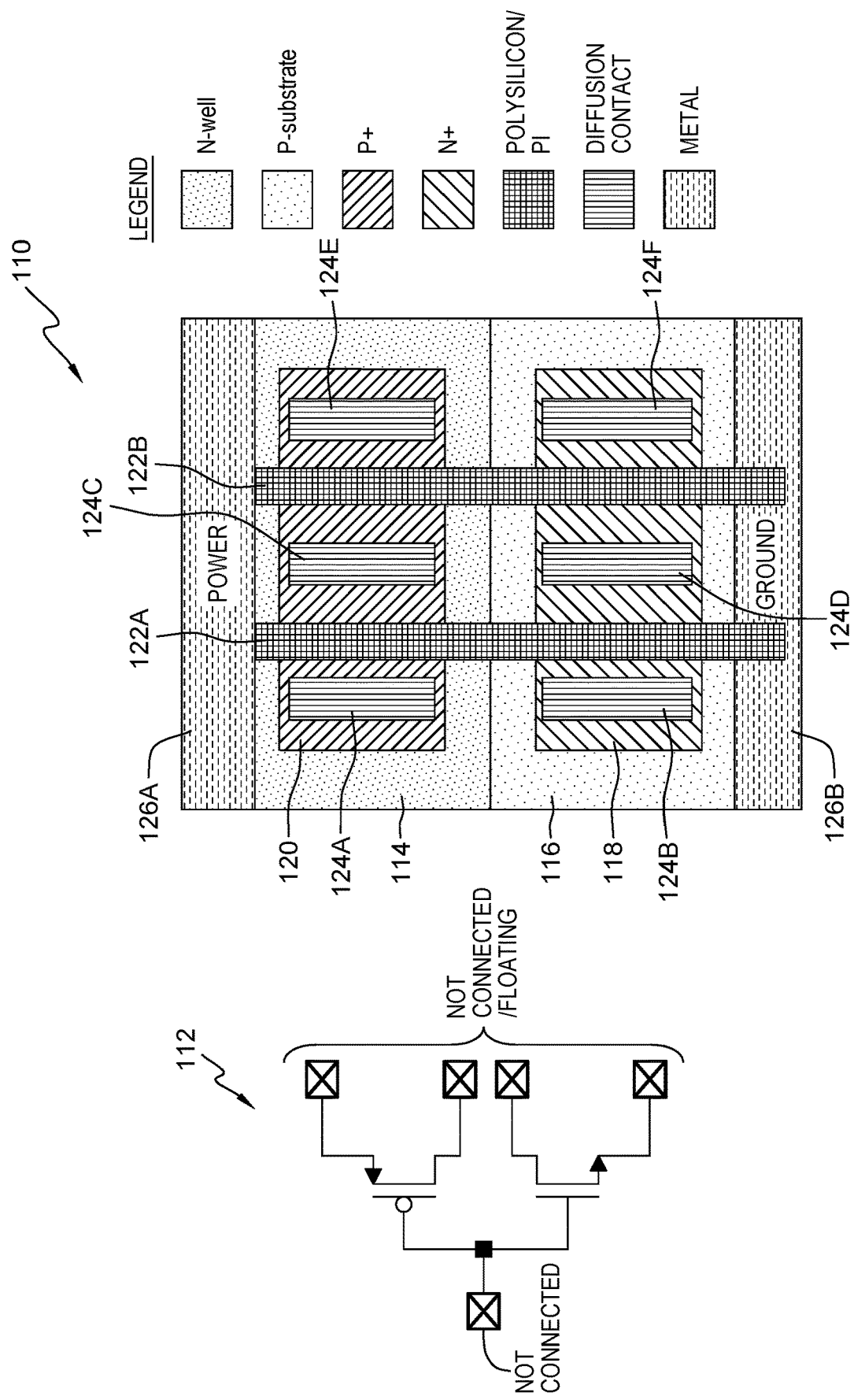
FIG. 2B is a schematic top view of a filler cell with a circuit diagram thereof, in accordance with an embodiment of the present disclosure.

FIG. 2B is a schematic top view of filler cell 110 with circuit diagram 112 thereof. In the illustrated embodiment, filler cell 110 is a configurable component that can be positioned at each primary input to a macro 108 (shown in FIG. 1) as a placeholder prior to determining the final structure that will be fabricated in that position. In some embodiments, a primary input is a connection of a feature in a macro 108 that is driven by a higher-level component, such as, for example, a chiplet 106. Filler cell 110 is proximate (e.g., in contact with and/or in the same macro level) to N-well 114 and P-substrate 116. Filler cell 110 comprises N+ 118, P+ 120, polysilicons/PIs 122A-122B, and diffusion contacts 124A-124F.

The components and configuration of filler cell 110 are electrically represented in circuit diagram 112. Circuit diagram 112 essentially shows "half" of filler cell 110 (i.e., the portion including polysilicon/PI 122A and diffusion contacts 124A-124D), although the other "half" (i.e., the portion including polysilicon/PI 122B and diffusion contacts 124C-124F) would be the same. Since filler cell 110 is a configurable element, circuit diagram 112 includes one unconnected lead on the left side (representing polysilicon/PI 122A) and four unconnected leads on the right side (representing diffusion contacts 124A-124D).

As shown in FIG. 2B, filler cell 110 includes power lead 126A and ground lead 126B (collectively, "leads 126"). Leads 126 are comprised of a conductive metal material, as are other components (not shown) of IC chip 100 (shown in FIG. 1). As stated previously, such metal components can collect electrical charges during the manufacturing of IC chip 100, which can damage components of macro 108. In an attempt to predict whether or not this will happen at a given primary input, an antenna calculation is performed.

The antenna calculation can include a calculation of the ratio between the metal area to the gate area and comparing that ratio to a predetermined threshold value. If the ratio is higher than the threshold, then there is an antenna violation meaning that there is too high a risk of damage during fabrication. The calculation of metal area can be performed using an antenna prediction parameter (APP), which factors in design data such as Manhattan distance (i.e., the length of the planar distance traveled, not merely the distance between the source and the sink), the distance between the source and sink layers, and a width parameter of the metal lead (e.g., an average width thereof from source to sink). This calculation is performed across the hierarchical levels of IC chip 100 (as appropriate), and the calculations for every primary input of macro 108 can be stored in an antenna interface file (AIF).

In the illustrated embodiment, whenever an antenna violation is calculated at a primary input, filler cell 110 will be configured as an antenna diode to protect the underlying components of macro 108. Such a solution is superior to the prior art solutions, which included adding an antenna diode to every primary input (without computing antenna violations), adding an antenna diode at the higher-level component, or attempting to predict the placement of antenna diodes solely based on the higher hierarchy architecture. Adding excess antenna diodes increases capacitance to the net, which increases power draw and resistive-capacitive delay. Placing an antenna diode at a higher level away from the silicon substrate decreases the effectiveness of the antenna diode and can leave the gates insufficiently protected. Attempting to predict the antenna diode placement based on the higher levels can lead to overdesign (i.e., too many antenna diodes) or underdesign (i.e., too few antenna diodes), both of which can have the aforementioned negative effects on IC chip 100.

Therefore, including configurable filler cells 110 at some or all of the primary inputs of macro 108 allows for macro 108 to be designed as stand-alone components that can be adapted to work with higher-level components with minimal effort (i.e., no redesign of macro 108 is required). This can be especially helpful if electronic design automation (EDA) is employed to make the higher-level components. While helpful, EDA uses automation and machine learning to design the higher-level components, which can lead to frequent and difficult-to-predict changes in design. As will be discussed below, if a filler cell 110 does not need to be configured as an antenna diode, then there are other useful devices that filler cell 110 can be configured as such as, for example, a decoupling capacitor (decap) cell, an inverter, a not-and (NAND) gate, a not-or (NOR) gate, a tie-high cell, or a tie-low cell.

Figure 3:
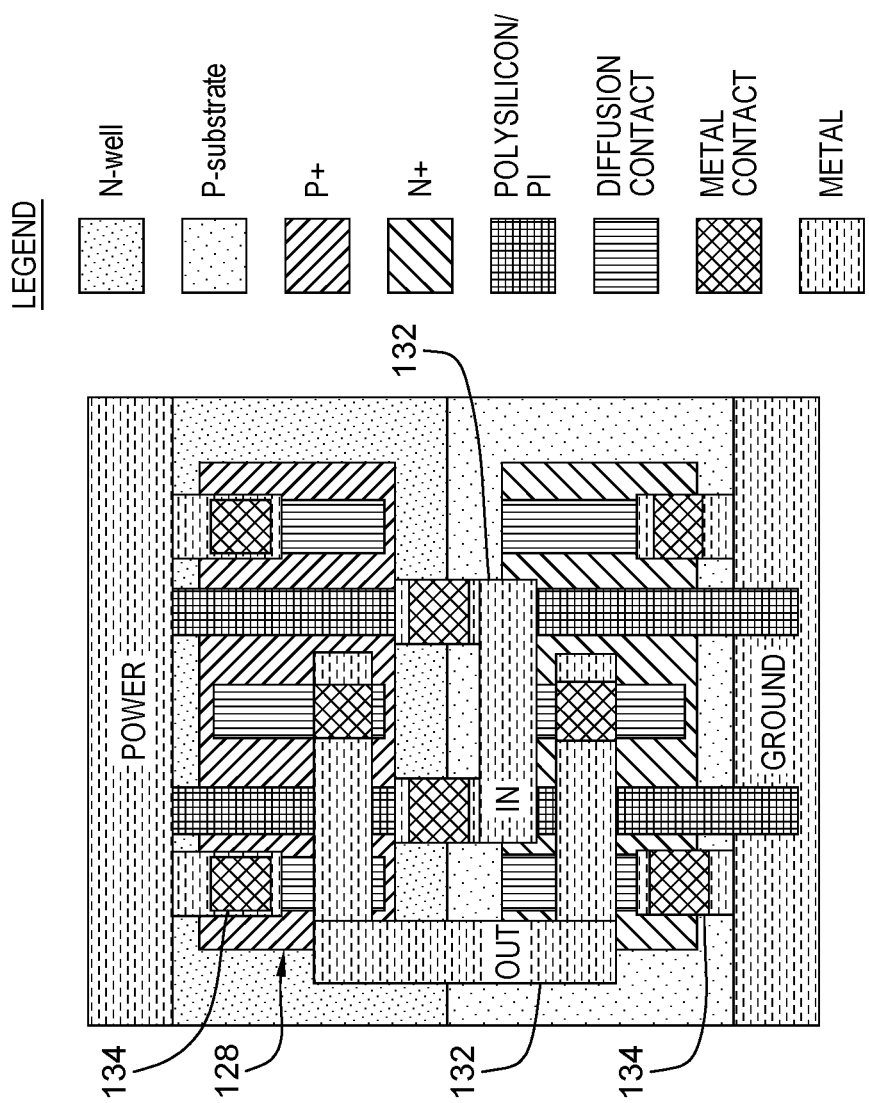
FIG. 3 is a top view of a filler cell converted into an inverter with a circuit diagram thereof, in accordance with an embodiment of the present disclosure.
Figure 3:
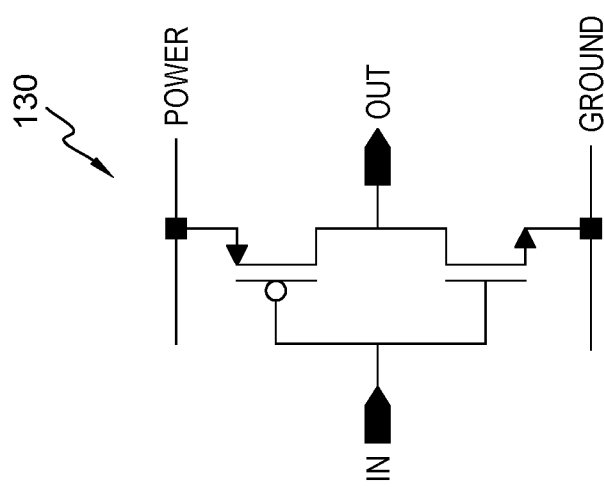

FIG. 3 is a top view of filler cell 110 (shown in FIG. 2B) converted into inverter 128 with a circuit diagram 130 thereof. This conversion can occur by designating the particular filler cell 110 to inverter 128 (instead of an antenna diode) in a design exchange format (DEF) file associated with the macro 108. Then, the DEF file is used during one or more manufacturing processes (e.g., mask fabrication, etching, etc.) to make a physical version of macro 108. Thereby, inverter 128 includes metal interconnects 132 and metal contacts 134 over (and selectively connected to) the original architecture of filler cell 110.

Figure 4:
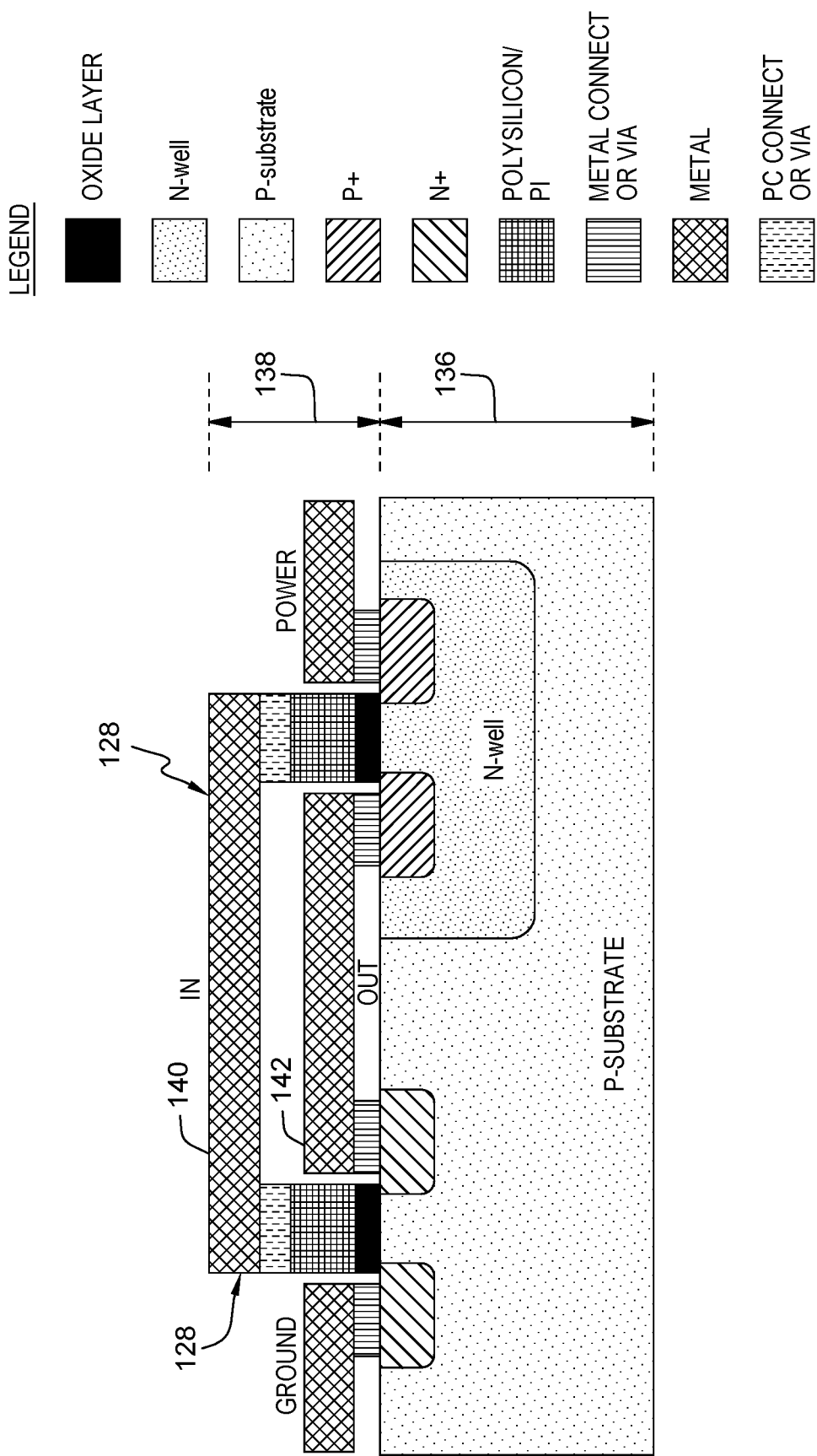
FIG. 4 is a cross-sectional side view of the inverter of FIG. 3 including device and interconnect information, in accordance with an embodiment of the present disclosure.

FIG. 4 is a cross-sectional side view of inverter 128 of FIG. 3. In the illustrated embodiment, front end of line (FEOL) portion 136 is differentiated from back end of line (BEOL) portion 138. In some embodiments, BEOL portion 138 can include more layers. In addition, inverter 128 (of macro 108, shown in FIG. 2A) can be connected to higher-level components at input 140 and/or output 142.

Figure 5:
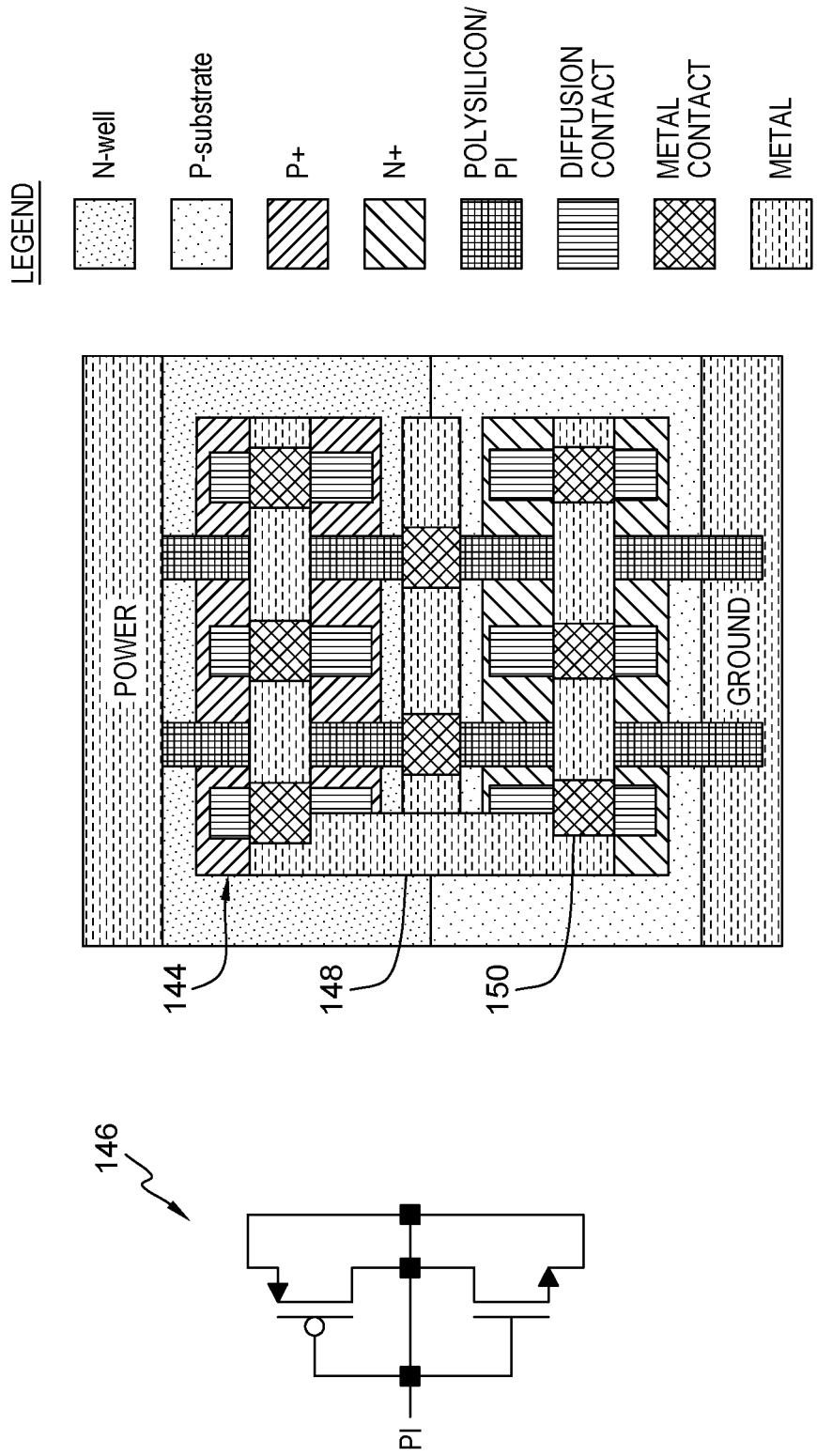
FIG. 5 is a top view of a filler cell converted into an antenna diode with a circuit diagram thereof, in accordance with an embodiment of the present disclosure.

FIG. 5 is a top view of filler cell 110 (shown in FIG. 2B) converted into antenna diode 144 with circuit diagram 146 thereof. This conversion can occur by designating the particular filler cell 110 to antenna diode 144 in a design exchange format (DEF) file associated with the macro 108 (shown in FIG. 2A). Then, the DEF file is used during one or more manufacturing processes (e.g., mask fabrication, etching, etc.) to make a physical version of macro 108. Thereby, antenna diode 144 includes metal interconnects 148 and metal contacts 150 over (and selectively connected to) the original architecture of filler cell 110. In the illustrated embodiment, antenna diode 144 is not an active circuit (i.e., it is not connected to power or ground, as shown in circuit diagram 146), but it can still protect N-well 114, P-substrate 116, N+ 118, and/or P+ 120 from antenna violations.

Figure 6:
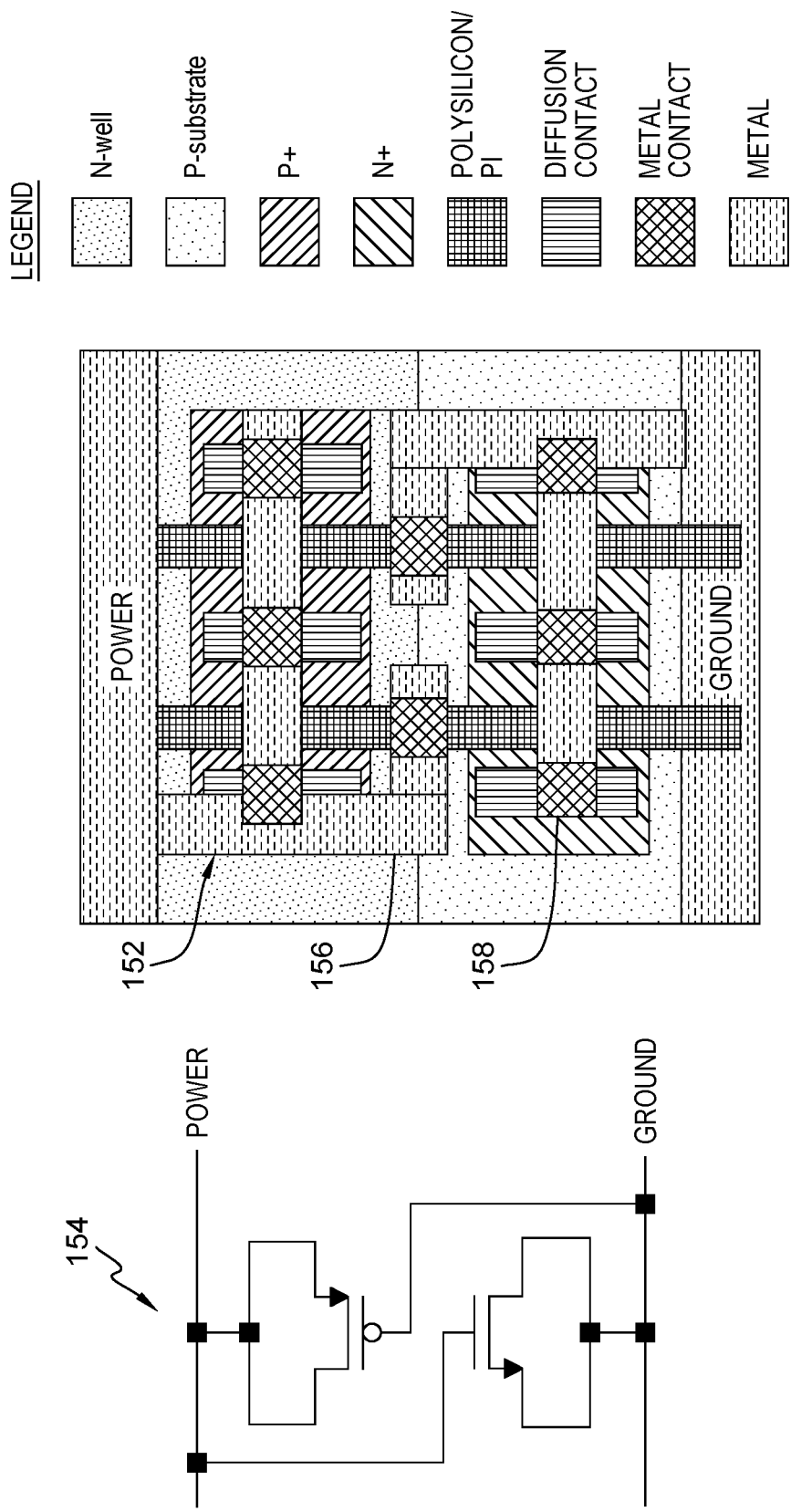
FIG. 6 is a top view of a filler cell converted into a decoupling capacitor (decap) cell with a circuit diagram thereof, in accordance with an embodiment of the present disclosure.

FIG. 6 is a top view of filler cell 110 (shown in FIG. 2B) converted into decoupling capacitor (decap) cell 152 with circuit diagram 154 thereof. This conversion can occur by designating the particular filler cell 110 to decap cell 152 in a design exchange format (DEF) file associated with the macro 108 (shown in FIG. 2A). Then, the DEF file is used during one or more manufacturing processes (e.g., mask fabrication, etching, etc.) to make a physical version of macro 108. Thereby, decap cell 152 includes metal interconnects 156 and metal contacts 158 over (and selectively connected to) the original architecture of filler cell 110. In the illustrated embodiment, decap cell 152 can increase the performance of macro 108, so it is the default state of filler cell 110 if an antenna diode 144 or any other component is not needed at that particular location.

Figure 7:
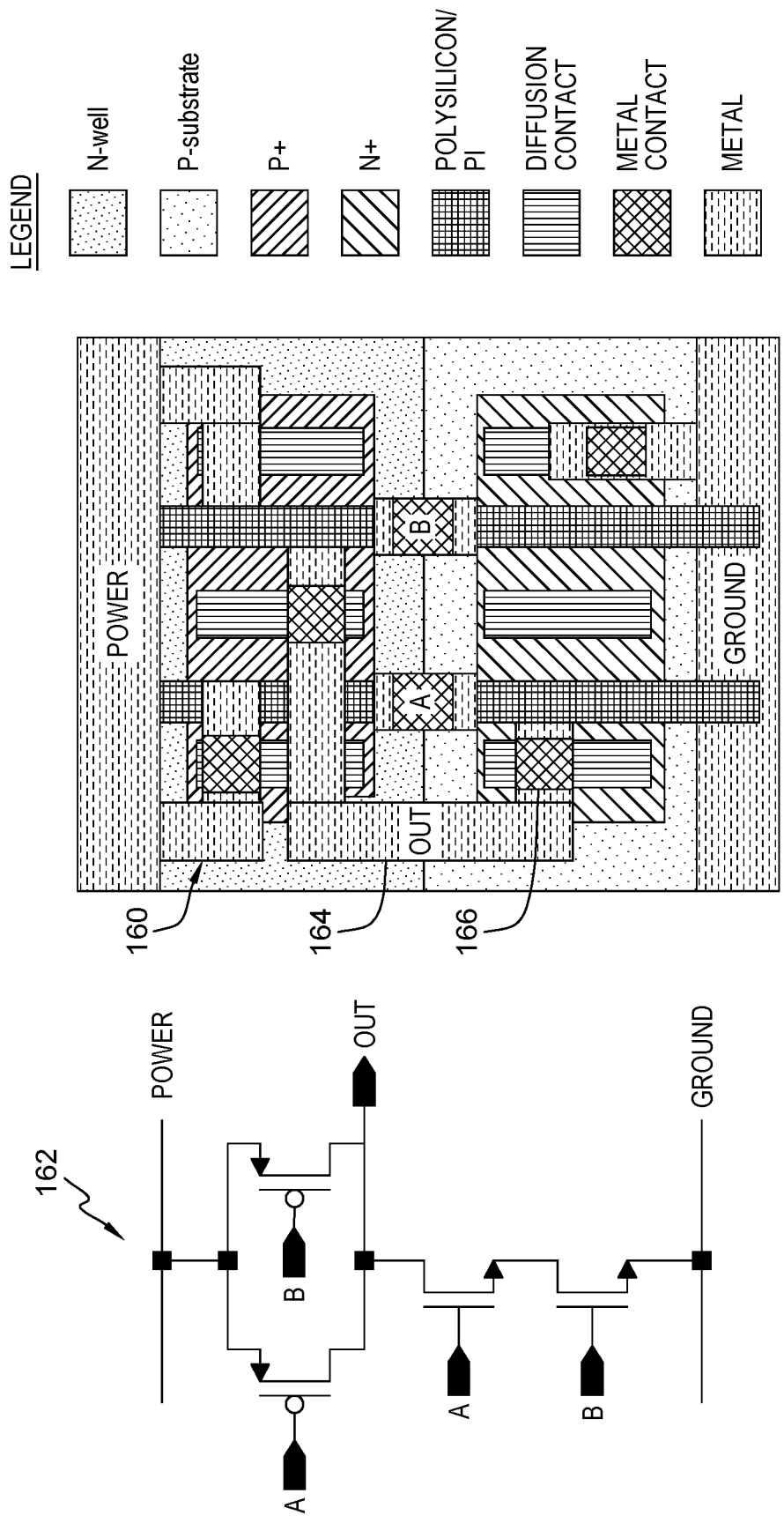
FIG. 7 is a top view of a filler cell converted into a two-input not-and (NAND2) logic gate with a circuit diagram thereof, in accordance with an embodiment of the present disclosure.

FIG. 7 is a top view of filler cell 110 (shown in FIG. 2B) converted into NAND2 logic gate 160 with circuit diagram 162 thereof. This conversion can occur by designating the particular filler cell 110 to NAND2 logic gate 160 in a design exchange format (DEF) file associated with the macro 108 (shown in FIG. 2A). Then, the DEF file is used during one or more manufacturing processes (e.g., mask fabrication, etching, etc.) to make a physical version of macro 108. Thereby, NAND2 logic gate 160 includes metal interconnects 164 and metal contacts 166 over (and selectively connected to) the original architecture of filler cell 110.

Figure 8:
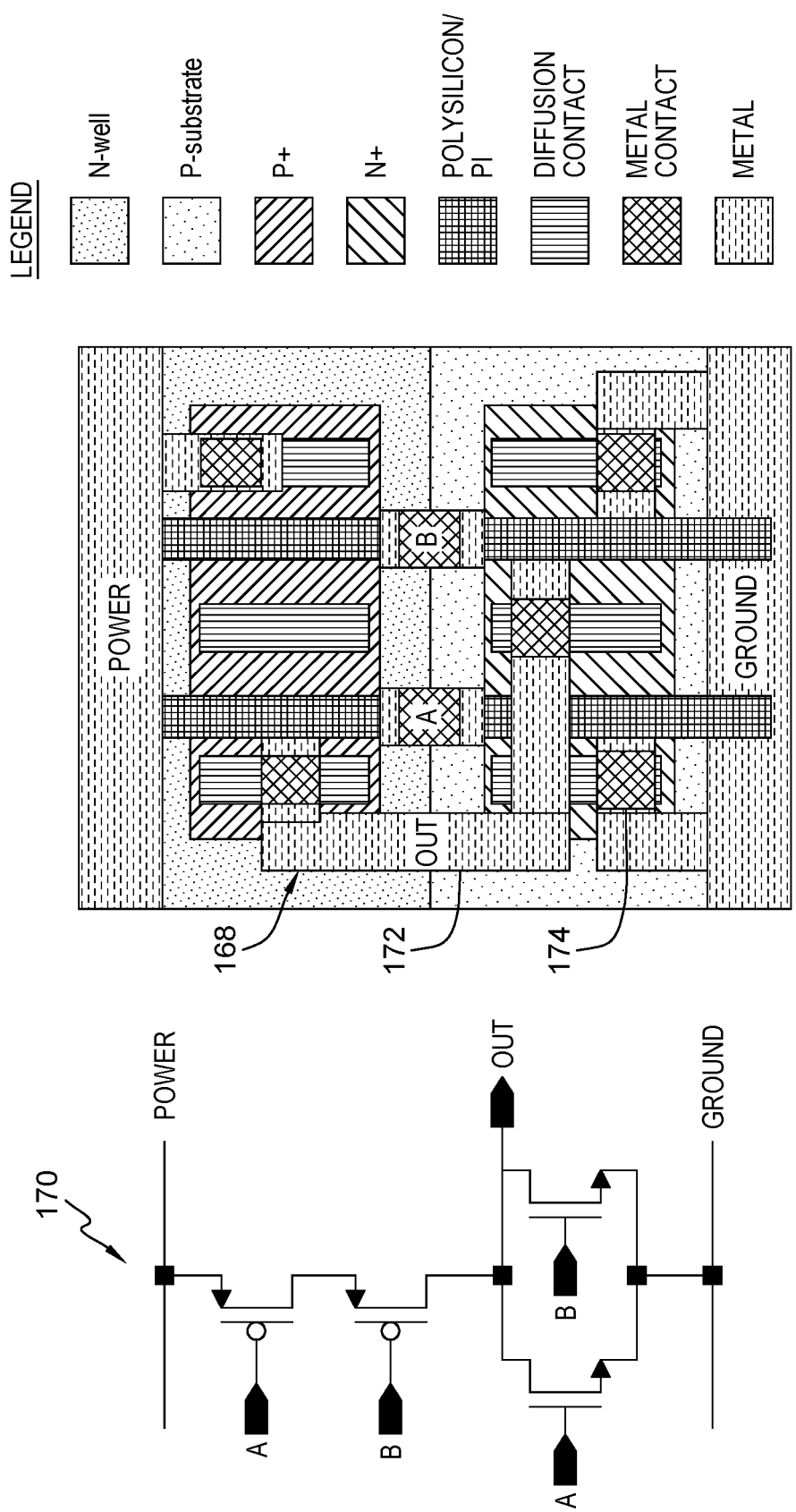
FIG. 8 is a top view of a filler cell converted into a two-input not-or (NOR2) logic gate with a circuit diagram thereof, in accordance with an embodiment of the present disclosure.

FIG. 8 is a top view of filler cell 110 (shown in FIG. 2B) converted into NOR2 logic gate 168 with circuit diagram 170 thereof. This conversion occurs by designating the particular filler cell 110 to NOR2 logic gate 168 in a design exchange format (DEF) file associated with the macro 108 (shown in FIG. 2A). Then, the DEF file is used during one or more manufacturing processes (e.g., mask fabrication, etching, etc.) to make a physical version of macro 108. Thereby, NOR2 logic gate 168 includes metal interconnects 172 and metal contacts 174 over (and selectively connected to) the original architecture of filler cell 110.

Figure 9:
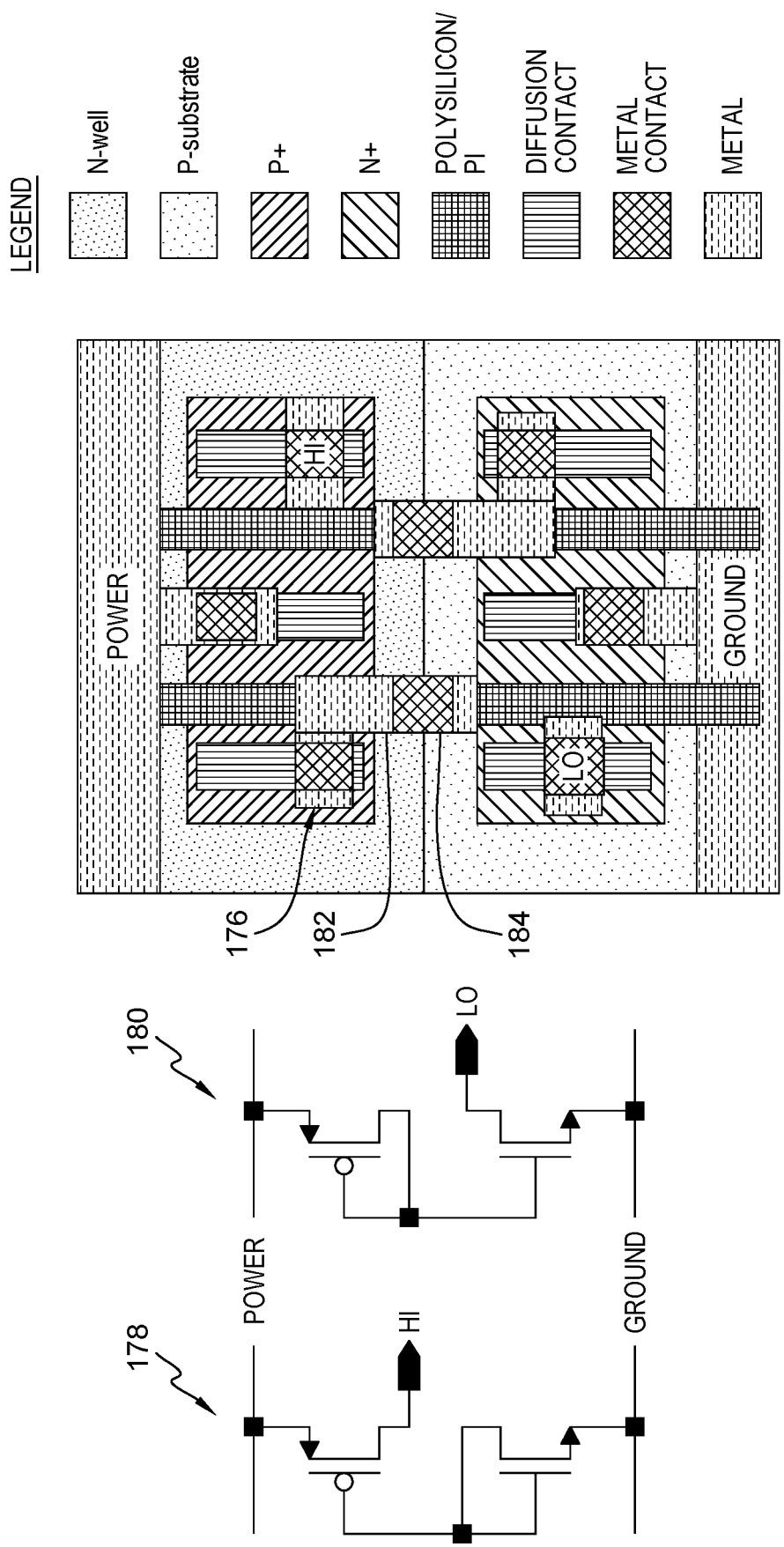
FIG. 9 is a top view of a filler cell converted into a tie cell with a circuit diagram thereof, in accordance with an embodiment of the present disclosure.

FIG. 9 is a top view of filler cell 110 (shown in FIG. 2B) converted into tie cell 176 with circuit diagram 178 (for tie-high) and circuit diagram 180 (for tie-low) thereof (depending on which output is selected). This conversion occurs by designating the particular filler cell 110 to tie cell 176 in a design exchange format (DEF) file associated with the macro 108 (shown in FIG. 2A). Then, the DEF file is used during one or more manufacturing processes (e.g., mask fabrication, etching, etc.) to make a physical version of macro 108. Thereby, tie cell 176 includes metal interconnects 182 and metal contacts 184 over the original architecture of filler cell 110.

Figure 10:
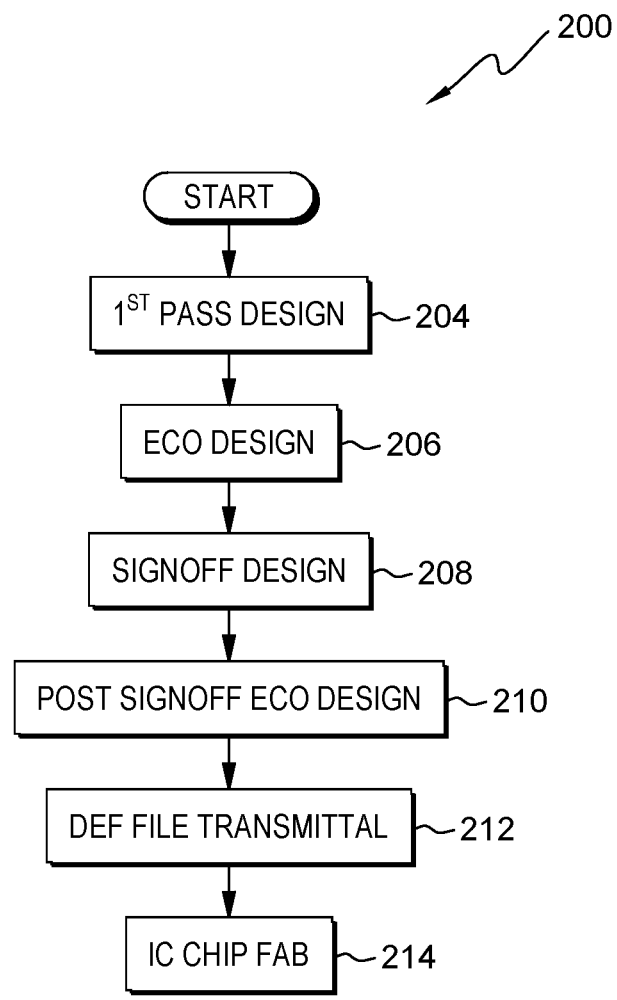
FIG. 10 is a flowchart of a method of designing and manufacturing the IC chip, in accordance with an embodiment of the present disclosure.

FIG. 10 is a flowchart of method 200 of designing and manufacturing IC chip 100 (shown in FIG. 1). During the discussion of method 200, some of the features shown in FIGS. 1-9 will be included using their respective reference numerals.

In the illustrated embodiment, at operation 204 (First Pass Design), the design process starts with predesigned macros 108 available for selection and configuration (i.e., via filler cells 110) by the designer of IC chip 100. These predesigned macros 108 can have set primary input locations (with filler cells 110 associated therewith), and calculations are performed for every primary input (using the APPs) on macros 108 to find antenna violations. If any antenna violations are found, then the associated filler cells 110 are configured as antenna diodes 144 in the DEF file. The primary inputs that do not include antenna violations maintain their filler cells 110 at this time. At operation 206 (ECO Design), engineering change orders (ECOs) for higher-level components are implemented (e.g., using EDA), so changes in any affected macros 108 are determined. This can include performing antenna violation calculations again for any filler cell 110 that has not already been configured as an antenna diode 144. If any additional antenna violations are found, then the associated filler cells 110 are configured as antenna diodes 144 in the DEF file. The primary inputs that do not include antenna violations maintain their filler cells 110 at this time.

In addition, ECOs that require additional logic gates (e.g., an inverter 128, a NAND2 gate 160, a NOR2 gate 168, a tie-high cell 176 (HI, circuit diagram 178), or a tie-low cell 176 (LO, circuit diagram 180)) are configured accordingly.

At operation 208 (Signoff Design), antenna violations are recalculated for any configured antenna diodes 144. If any of the antenna diodes 144 are no longer necessary (i.e., there is no longer an antenna violation), then decap cells 152 are configured at those primary inputs. For any antenna diodes 144 that are still necessary (i.e., there is still an antenna violation), their configurations are finalized (i.e., the interconnects 148 and contacts 150 are routed and drawn in the DEF file, as are the interconnects 111 to the higher-level components). In addition, any (or all) remaining filler cells 110 can be configured as decap cells 152 to solve voltage (IR) drop issues that are present. At operation 210 (Post-Signoff ECO Design), further ECOs for higher-level components are implemented (e.g., using EDA), so any remaining filler cells 110 can be configured as inverters 128 to accommodate new input pins, if needed for a given macro 108. In addition, any decap cells 152 can be reconfigured as additional logic gates (e.g., an inverter 128, a NAND2 gate 160, a NOR2 gate 168, a tie-high cell 176 (HI, circuit diagram 178), or a tie-low cell 176 (LO, circuit diagram 180)). At operation 212 (DEF File Transmittal), the DEF file is finalized (e.g., all of the configurations of filler cells 110 are routed and drawn in) and is sent to the foundry for fabrication. At operation 214 (IC Chip Fab), the foundry uses the DEF file to create hardware versions of the designed IC chip 100, for example, using masks that actualize the configuration for each filler cell 110.

Figure 11:
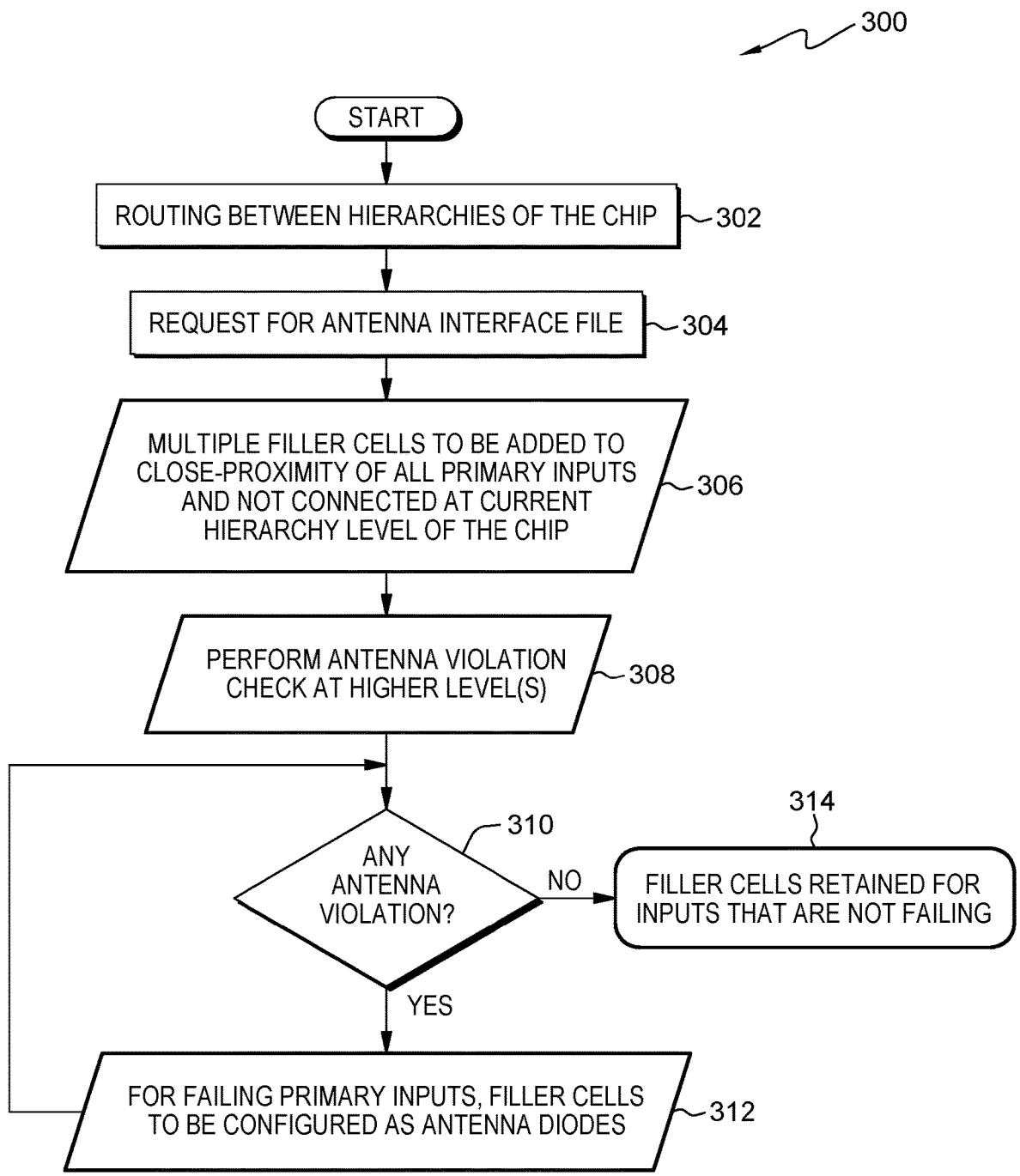
FIG. 11 is a flowchart of a method of performing the first pass design operation of FIG. 10, in accordance with an embodiment of the present disclosure.

FIG. 11 is a flowchart of method 300 of performing the first pass design operation 204 of FIG. 10. During the discussion of method 300, some of the features shown in FIGS. 1-10 will be included using their respective reference numerals At operation 302, the routing (e.g., interconnects and vias) between the different hierarchical layers of IC chip 100 is laid out by the IC chip designer. At operation 304, the macro designer requests the AIF from one or more of the higher-level designers (e.g., the IC chip and/or chiplet designers). At operation 306, filler cells 110 are added to each primary input in macros 108. At operation 308, antenna calculations are performed using the AIF. At operation 310, the results of the calculations are compared against a predetermined threshold to determine if there are any antenna violations. If so, at operation 312, the filler cell 110 of an offending input is configured as an antenna diode 144. When there are no more antenna violations, method 300 moves to operation 314 wherein the remaining filler cells 110 are not configured and are retained as filler cells 110. In some embodiments, some or all of method 300 (e.g., operation 306) can occur repeatedly at different levels of the IC chip 100 hierarchy (assuming that filler cells 110 have been incorporated at the primary inputs of the higher-level components). For example, the connections between a macro 108 and its corresponding higher-level components can be analyzed. Then, the connections between a chiplet 106 and its corresponding higher-level components can be analyzed.

Figure 12:
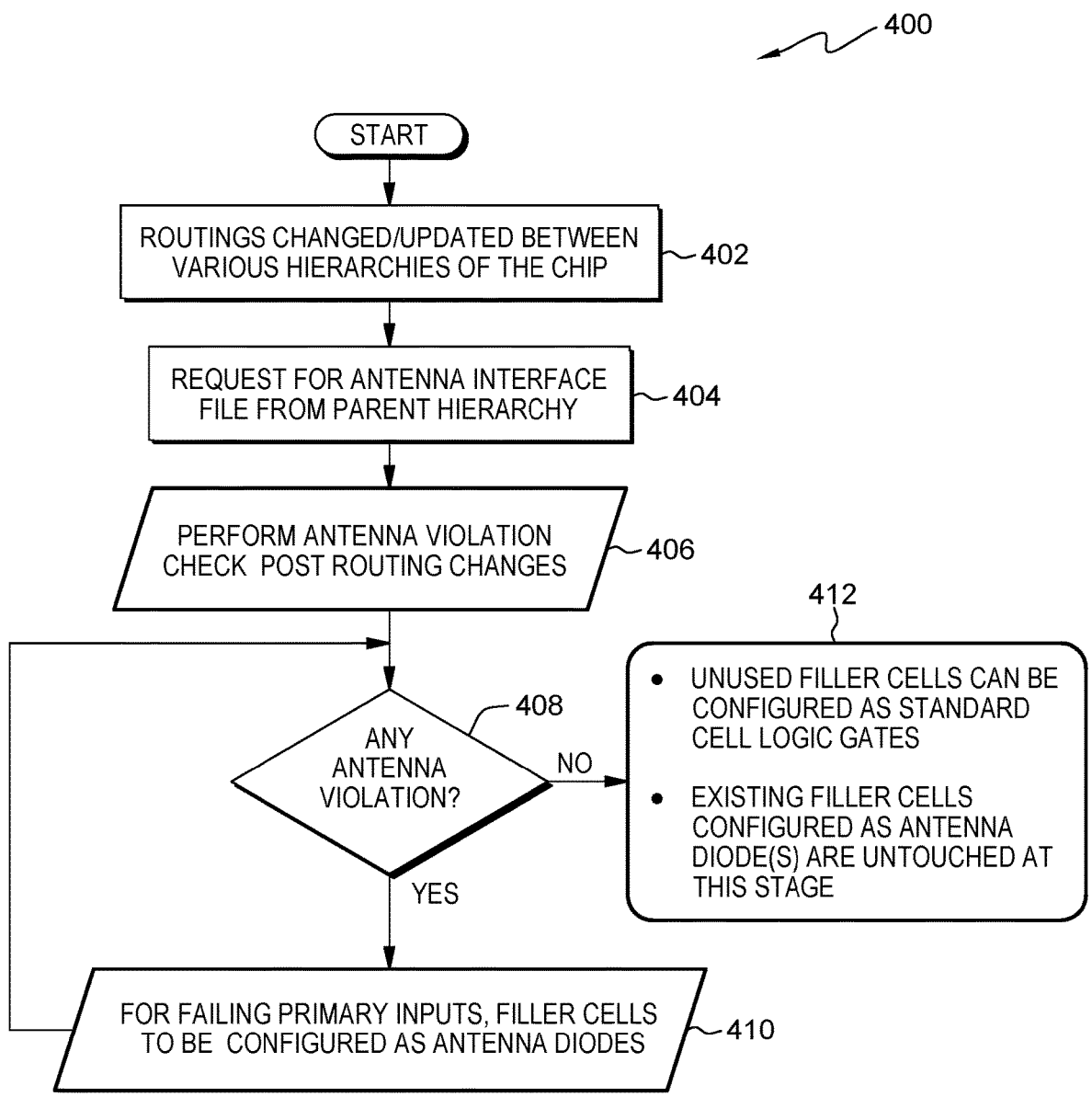
FIG. 12 is a flowchart of a method of performing the engineering change order (ECO) design operation of FIG. 10, in accordance with an embodiment of the present disclosure.

FIG. 12 is a flowchart of method 400 of performing the ECO design operation 206 of FIG. 10. During the discussion of method 400, some of the features shown in FIGS. 1-10 will be included using their respective reference numerals.

At operation 402, the routing between different hierarchical layers of IC chip 100 are changed and/or updated. At operation 404, the macro designer requests the revised AIF from one or more of the higher-level designers (e.g., the IC chip and/or chiplet designers). At operation 406, antenna calculations are performed again using the revised AIF. At operation 408, the results of the calculations are compared against a predetermined threshold to determine if there are any antenna violations. If so, at operation 410, the filler cell 110 of an offending input is configured as an antenna diode 144. When there are no more antenna violations, method 400 moves to operation 412 wherein unconfigured filler cells 110 can be configured at logic gates (e.g., an inverter 128, a NAND2 gate 160, a NOR2 gate 168, a tie-high cell 176 (HI, circuit diagram 178), or a tie-low cell 176 (LO, circuit diagram 180)), and the previously configured antenna diodes 144 are retained as antenna diodes 144. In some embodiments, some or all of method 400 (e.g., operations 404 and/or 406) can occur repeatedly at different levels of the IC chip 100 hierarchy (assuming that filler cells 110 have been incorporated at the primary inputs of the higher-level components). For example, the connections between a macro 108 and its corresponding higher-level components can be analyzed. Then, the connections between a chiplet 106 and its corresponding higher-level components can be analyzed.

Figure 13:
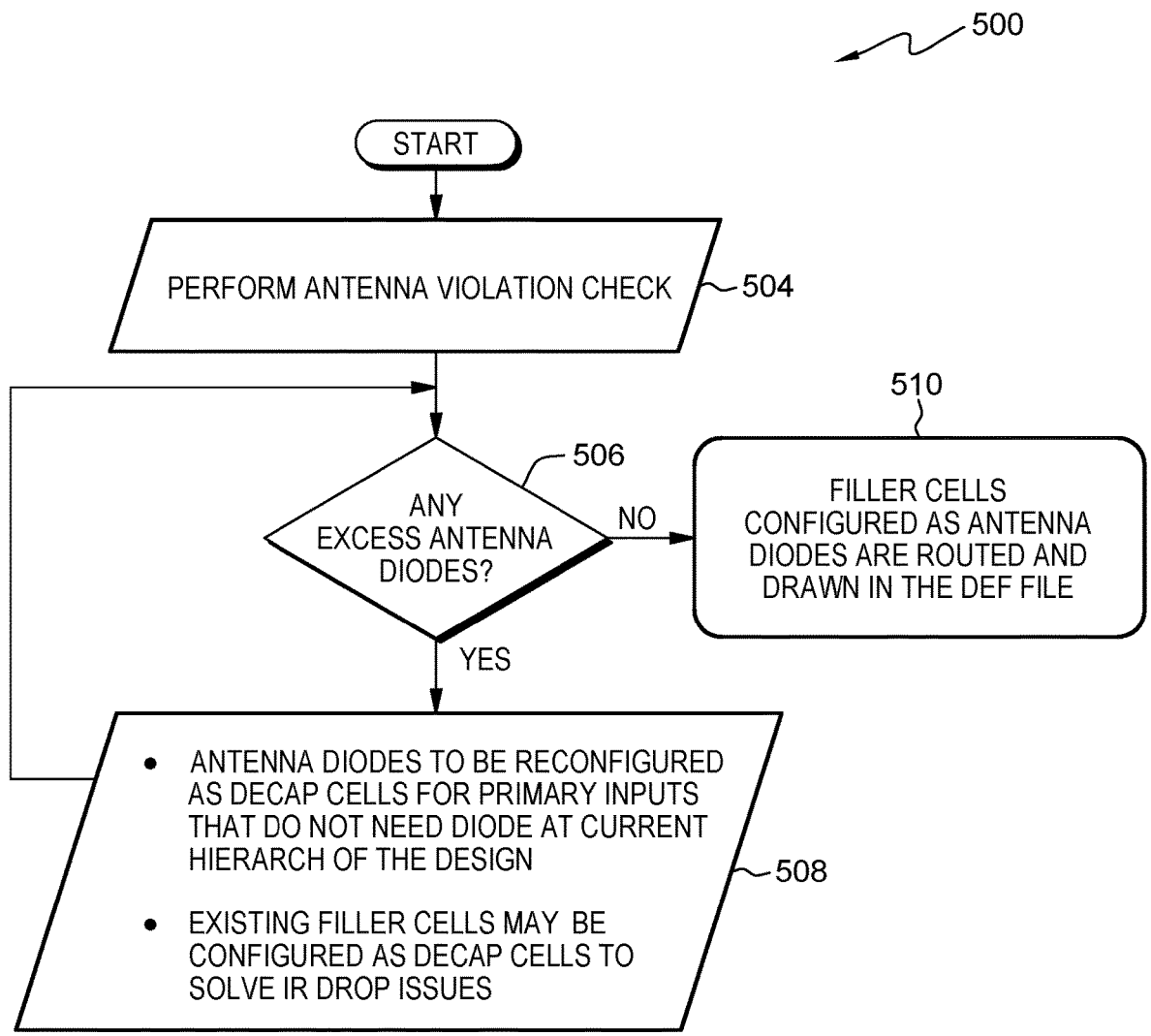
FIG. 13 is a flowchart of a method of performing the signoff design operation of FIG. 10, in accordance with an embodiment of the present disclosure.

FIG. 13 is a flowchart of method 500 of performing the signoff design operation 208 of FIG. 10. During the discussion of method 500, some of the features shown in FIGS. 1-10 will be included using their respective reference numerals.

At operation 504, antenna calculations are performed again using the revised AIF. At operation 506, the results of the calculations are compared against a predetermined threshold to determine if there are any excess antenna diodes 144 (from previous antenna violations). If so, at operation 508, the antenna diode 144 of an offending input is reconfigured as a decap cell 152, and some or all of the remaining filler cells can be configured as decap cells 152 as well. When there are no more excess antenna diodes 144, method 500 moves to operation 510 wherein the connections of the remaining antenna diodes 144 to the higher levels are routed and drawn in the DEF file.

Figure 14:
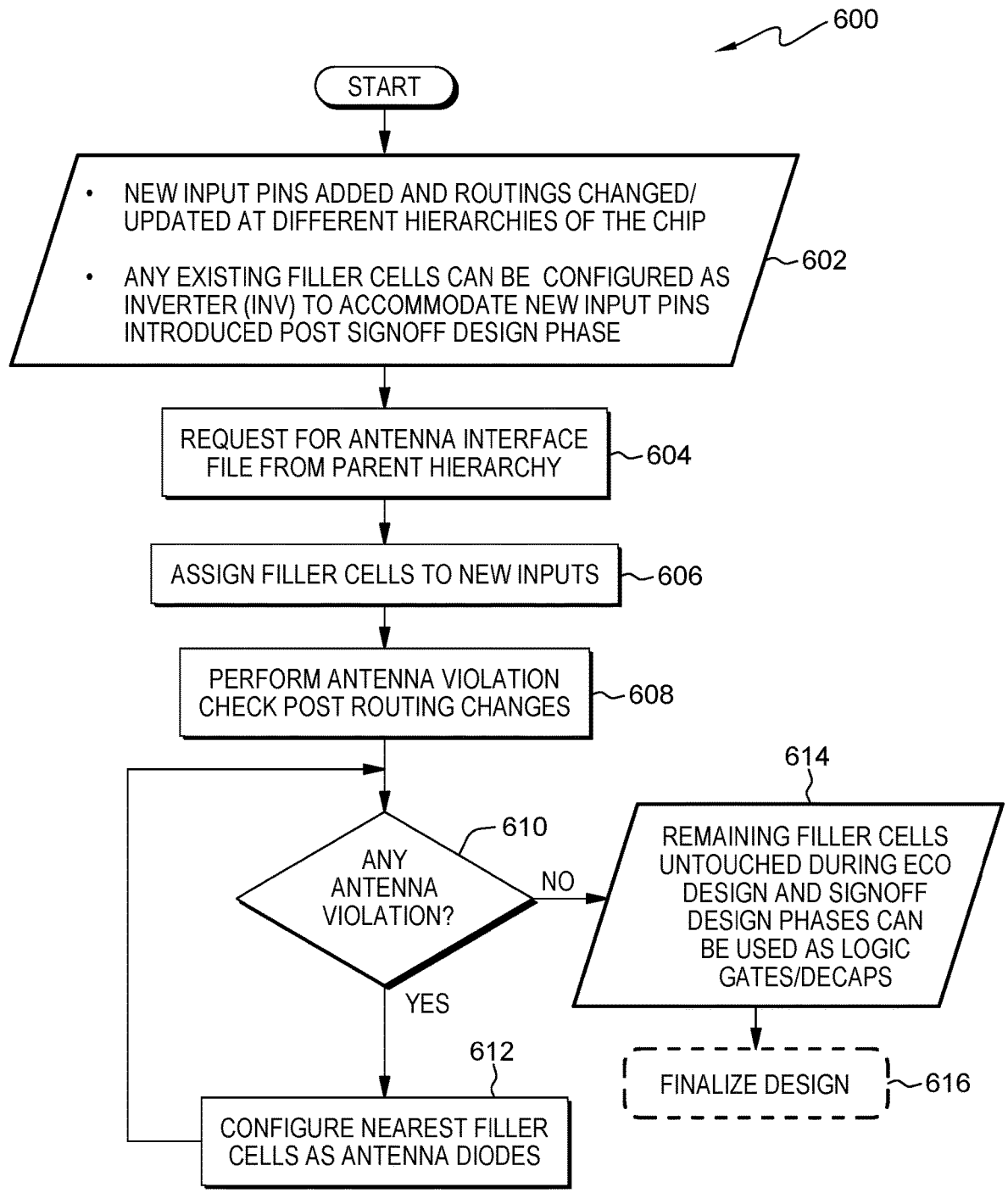
FIG. 14 is a flowchart of a method of performing the post-signoff design operation of FIG. 10, in accordance with an embodiment of the present disclosure.

FIG. 14 is a flowchart of method 600 of performing the post-signoff design operation 210 of FIG. 10. During the discussion of method 600, some of the features shown in FIGS. 1-10 will be included using their respective reference numerals.

At operation 602, the routing between different hierarchical layers of IC chip 100 are changed and/or updated. In addition, new primary inputs in macros 108 can be added by configuring existing filler cells 110 as inverters 128. At operation 604, the macro designer requests the newly revised AIF from one or more of the higher-level designers (e.g., the IC chip and/or chiplet designers). At operation 606, new primary inputs are assigned filler cells 110 at the nearest possible locations. At operation 608, antenna calculations are performed again using the newly revised AIF. At operation 610, the results of the calculations are compared against a predetermined threshold to determine if there are any antenna violations. If so, the nearest filler cells 110 are configured as antenna diodes 144 at operation 612. When there are no more antenna violations, method 600 moves to operation 614 wherein any remaining unconfigured filler cells 110 are configured as logic gates (if desired) or decap cells 152 (by default). At operation 616, the design of macros 108 is finalized.

Figure 15:
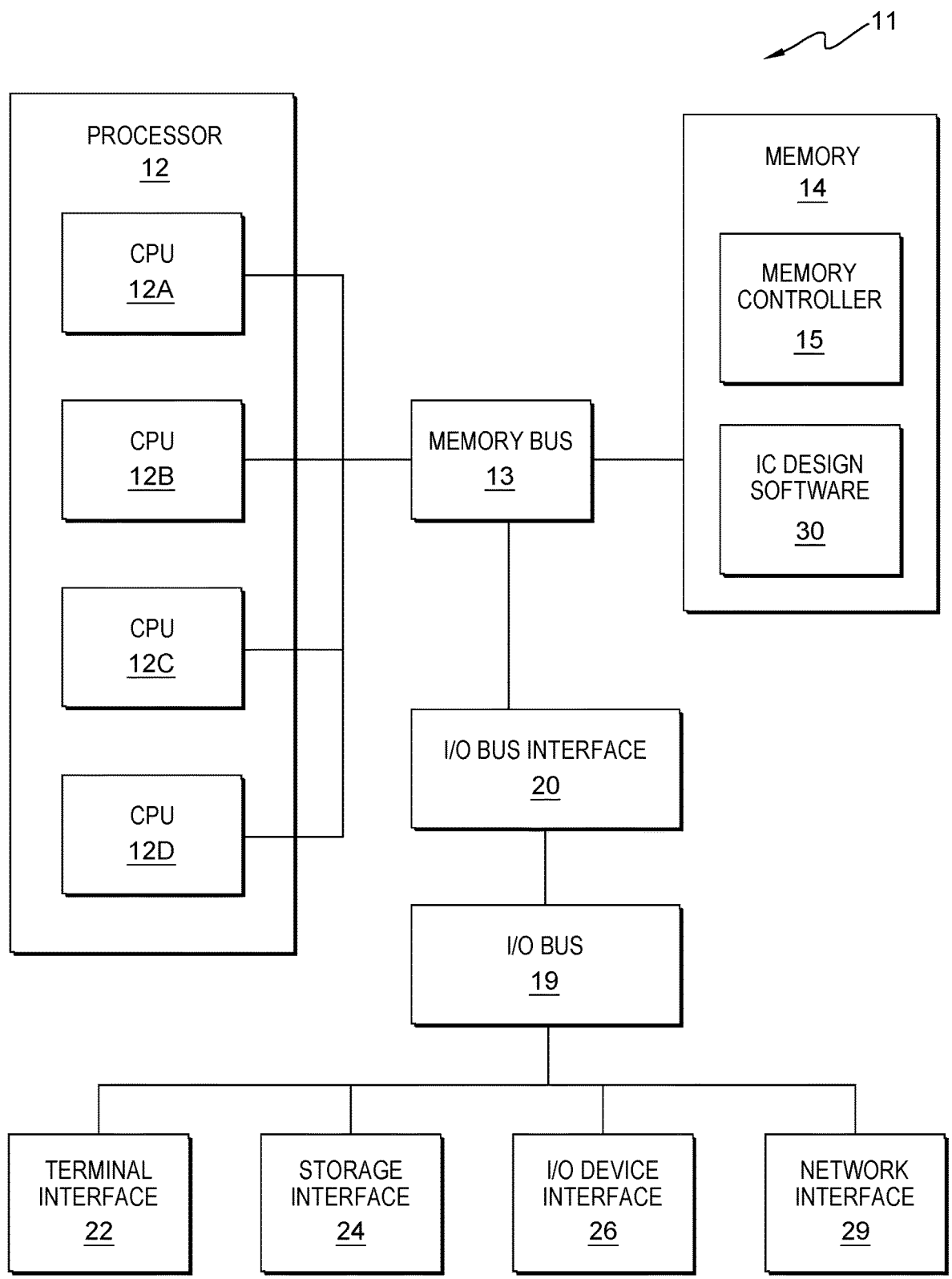
FIG. 15 shows a high-level block diagram of an example computer system that can be used in implementing embodiments of the present disclosure.

Referring now to FIG. 15, shown is a high-level block diagram of an example computer system (i.e., computer) 11 that may be used in implementing one or more of the methods or modules, and any related functions or operations, described herein (e.g., using one or more processor circuits or computer processors of the computer), in accordance with embodiments of the present disclosure. For example, computer system 11 can be used to handle the AIF, DEF file, antenna violation calculations and/or EDA tasks. In some embodiments, the components of the computer system 11 may comprise one or more CPUs 12, a memory subsystem 14, a terminal interface 22, a storage interface 24, an I/O (Input/Output) device interface 26, and a network interface 29, all of which may be communicatively coupled, directly or indirectly, for inter-component communication via a memory bus 13, an I/O bus 19, and an I/O bus interface unit 20.

The computer system 11 may contain one or more general-purpose programmable central processing units (CPUs) 12A, 12B, 12C, and 12D, herein generically referred to as the processor 12. In some embodiments, the computer system 11 may contain multiple processors typical of a relatively large system; however, in other embodiments, the computer system 11 may alternatively be a single CPU system. Each CPU 12 may execute instructions stored in the memory subsystem 14 and may comprise one or more levels of on-board cache.

In some embodiments, the memory subsystem 14 may comprise a random-access semiconductor memory, storage device, or storage medium (either volatile or non-volatile) for storing data and programs. In some embodiments, the memory subsystem 14 may represent the entire virtual memory of the computer system 11 and may also include the virtual memory of other computer systems coupled to the computer system 11 or connected via a network. The memory subsystem 14 may be conceptually a single monolithic entity, but, in some embodiments, the memory subsystem 14 may be a more complex arrangement, such as a hierarchy of caches and other memory devices. For example, memory may exist in multiple levels of caches, and these caches may be further divided by function so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 14 may contain elements for control and flow of memory used by the processor 12. This may include a memory controller 15.

Although the memory bus 13 is shown in FIG. 15 as a single bus structure providing a direct communication path among the CPUs 12, the memory subsystem 14, and the I/O bus interface 20, the memory bus 13 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 20 and the I/O bus 19 are shown as single respective units, the computer system 11 may, in some embodiments, contain multiple I/O bus interface units 20, multiple I/O buses 19, or both. Further, while multiple I/O interface units are shown, which separate the I/O bus 19 from various communications paths running to the various I/O devices, in other embodiments, some or all of the I/O devices may be connected directly to one or more system I/O buses.

In some embodiments, the computer system 11 may be a multi-user mainframe computer system, a single-user system, or a server computer or similar device that has little or no direct user interface but receives requests from other computer systems (clients). Further, in some embodiments, the computer system 11 may be implemented as a desktop computer, portable computer, laptop or notebook computer, tablet computer, pocket computer, telephone, smart phone, mobile device, or any other appropriate type of electronic device.

In the illustrated embodiment, memory subsystem 14 further includes IC design software 30. The execution of IC design software 30 (for example, using an execution module) enables computer system 11 to perform one or more of the functions described above, for example, to store and/or transmit an AIF, a DEF file, calculate and recalculate antenna violations and/or perform EDA tasks.

It is noted that FIG. 15 is intended to depict representative components of an exemplary computer system 11. In some embodiments, however, individual components may have greater or lesser complexity than as represented in FIG. 15, components other than or in addition to those shown in FIG. 15 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
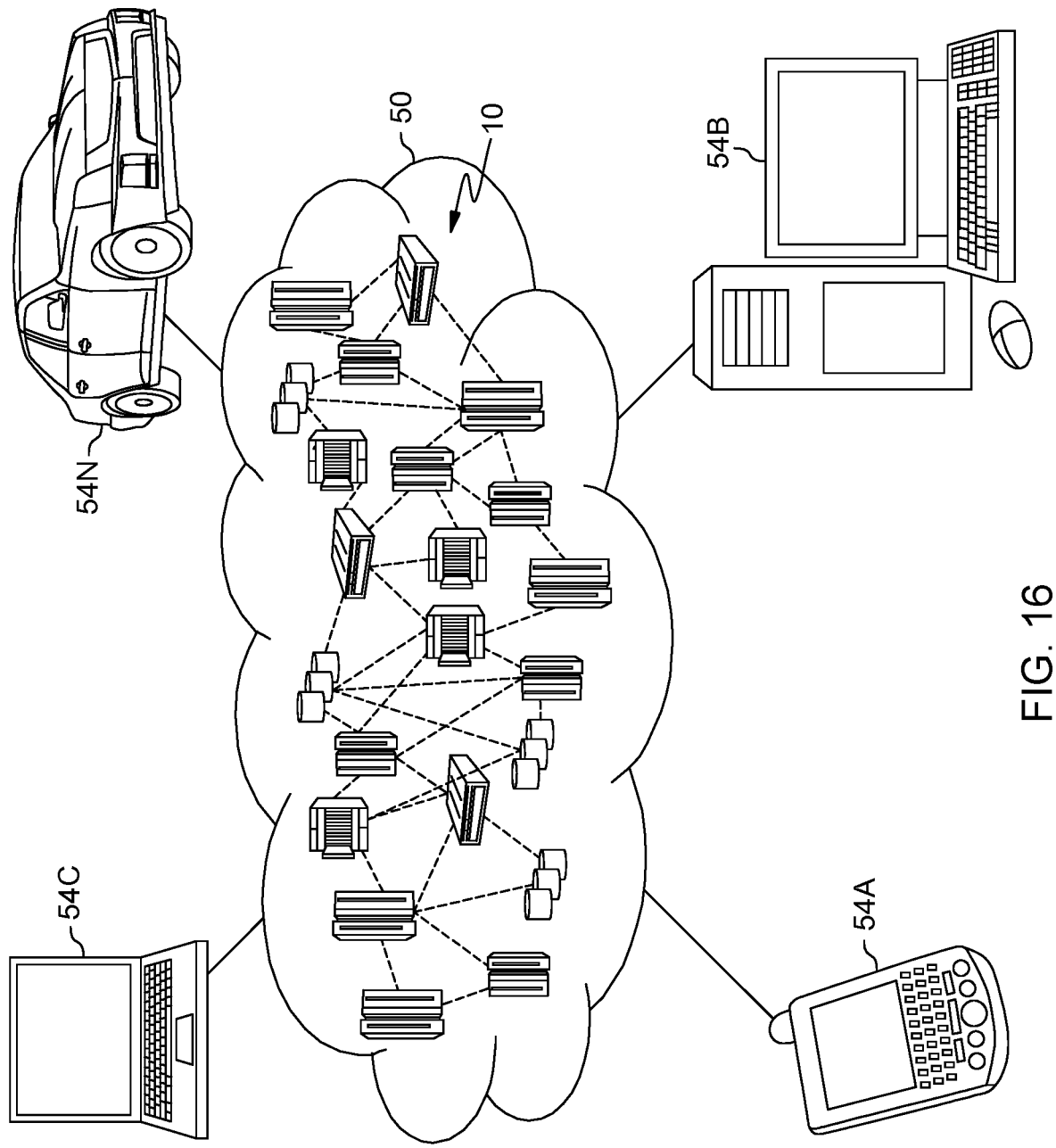
FIG. 16 shows a cloud computing environment, in accordance with an embodiment of the present disclosure.

Referring now to FIG. 16, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
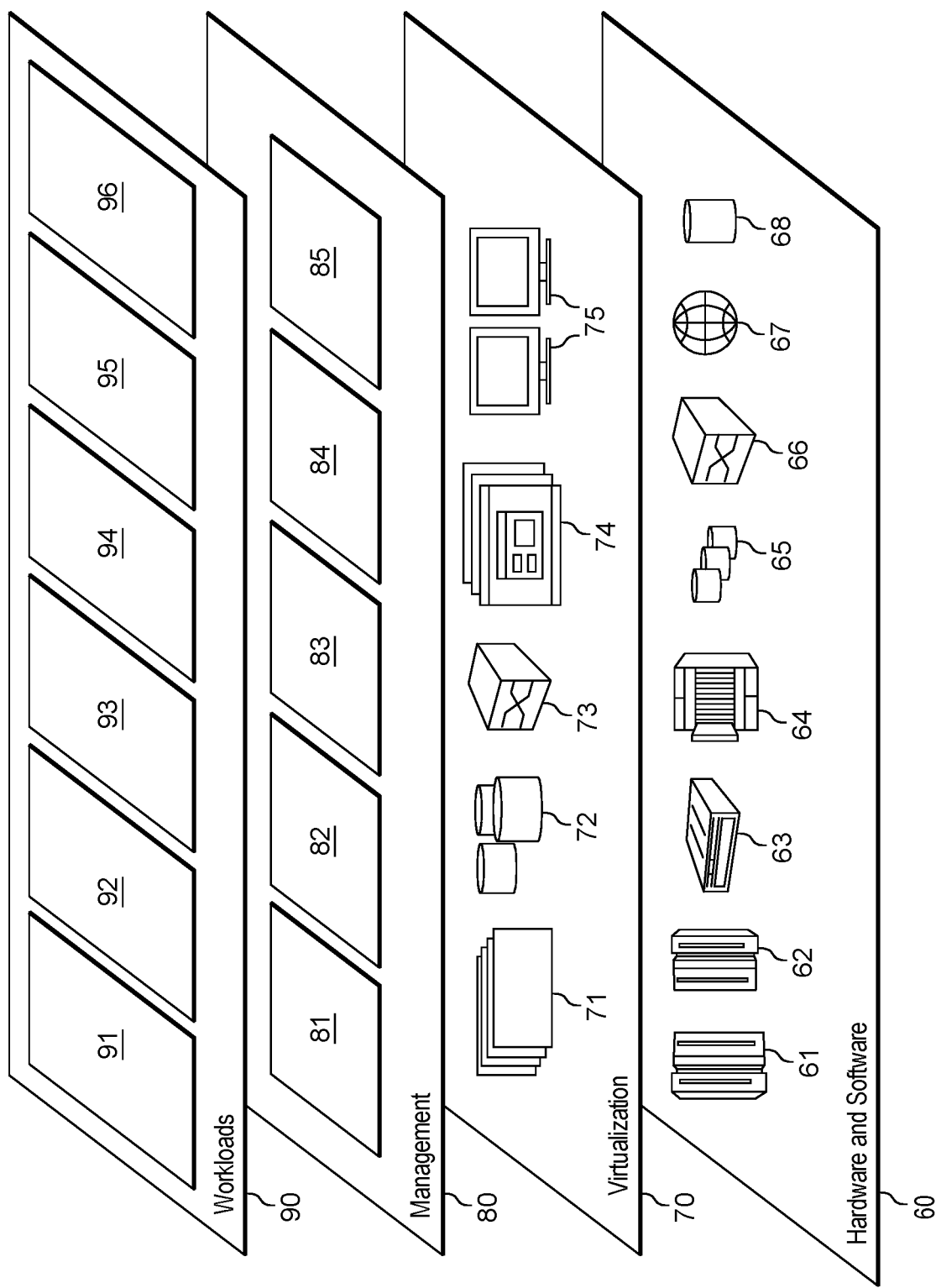
FIG. 17 shows abstraction model layers, in accordance with an embodiment of the present disclosure.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. s depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and integrated circuit design module 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of designing an integrated circuit (IC) chip, the method comprising:

designing a higher level comprising a plurality of outputs configured to be connected to inputs in a previously-designed macro level, wherein each input in the macro level includes a configurable filler cell;

calculating if each input includes an antenna violation based on the higher level and the macro level;

configuring each of the filler cells, wherein each filler cell associated with an antenna violation is configured as an antenna diode;

recalculating, after configuring, if each input includes an antenna violation; and comparing the results of the recalculating to a predetermined threshold to determine if there are excess antenna diodes.

2. The method of claim 1, further comprising:
upon determining that there are excess antenna diodes, reconfiguring at least one of the excess antenna diodes as a decoupling capacitor cell.

3. The method of claim 1, further comprising:
reconfiguring a filler cell, after configuring each of the filler cells, in response to determining a new logic requirement such that the filler cell is configured as a logic gate.

4. The method of claim 1, wherein the IC chip is designed in a design exchange format (DEF) file, and the method further comprises:
creating a fabrication mask based on the DEF file; and
creating the antenna diodes of the IC chip using the mask.

5. The method of claim 1, wherein each filler cell not associated with an antenna violation is configured as one of the group consisting of: a decoupling capacitor cell, an inverter, a not-and gate, a not-or gate, a tie-high cell, and a tie-low cell.

6. The method of claim 1, wherein the higher level is a level that is spaced apart from the macro level.

* * * * *